(12) United States Patent
Bolagani et al.

(10) Patent No.: US 11,693,727 B2
(45) Date of Patent: Jul. 4, 2023

(54) SYSTEMS AND METHODS TO IDENTIFY PRODUCTION INCIDENTS AND PROVIDE AUTOMATED PREVENTIVE AND CORRECTIVE MEASURES

(71) Applicant: JPMorgan Chase Bank, N.A., New York, NY (US)

(72) Inventors: Ashok Vardhan Rao Bolagani, Delaware, OH (US); Vijaya Kadiyala, Hyderabad (IN); Alina D Rodean, Hilliard, OH (US); Jason Bocz, Hilliard, OH (US); Rajesh Chekuri, Westerville, OH (US); Gaurav Bhatia, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 186 days.

(21) Appl. No.: 17/195,016

(22) Filed: Mar. 8, 2021

(65) Prior Publication Data
US 2022/0283891 A1    Sep. 8, 2022

(51) Int. Cl.
*G06F 11/07* (2006.01)
*G06F 16/245* (2019.01)
*G06Q 10/0631* (2023.01)

(52) U.S. Cl.
CPC ........ *G06F 11/0793* (2013.01); *G06F 11/079* (2013.01); *G06F 11/0724* (2013.01);
(Continued)

(58) Field of Classification Search
CPC .............. G06F 11/0793; G06F 16/245; G06F 11/0724; G06F 11/0751; G06F 11/079; G06Q 10/06311
See application file for complete search history.

(56) References Cited

U.S. PATENT DOCUMENTS 6,721,713 B1 *  4/2004  Guheen ................. G06Q 50/01
                                               715/202
8,560,889 B2 * 10/2013  Behrendt .............. G06F 11/203
                                               714/26

(Continued)

FOREIGN PATENT DOCUMENTS

CN    107678875 A  *  2/2018  .......... G06F 11/0751
EP     0306252 A2  *  3/1989  .............. G06F 11/00

(Continued)

*Primary Examiner* — Matthew M Kim
*Assistant Examiner* — Indranil Chowdhury
(74) *Attorney, Agent, or Firm* — Greenblum & Bernstein, P.L.C.

(57) ABSTRACT

Various methods, apparatuses/systems, and media for identifying production incidents and implementing automated preventive and corrective measures are disclosed. A processor automatically triggers, in response to a generated incident of a job/process/host failure, a self-healing service. The processor identifies an application to which the event generated belongs to by accessing a database that stores the application and host details; fetches functional identification (ID) of the application from the database, identifies the type of job failure or service degradation; automatically executes, by utilizing predefined micro services, the steps required for mitigation; records, in response to executing, outcome of the mitigation in the database along with output at each stage of execution; and evaluates the outcome of the mitigation by executing health checks using micro services to determine whether the failed job or process or host is healthy; and closes the incident based on healthy determination.

20 Claims, 8 Drawing Sheets

(52) U.S. Cl.
CPC ........ *G06F 11/0751* (2013.01); *G06F 16/245* (2019.01); *G06Q 10/06311* (2013.01)

(56) References Cited

U.S. PATENT DOCUMENTS

| | | | | |
|---|---|---|---|---|
| 9,355,009 | B2* | 5/2016 | Chen | G06F 11/3433 |
| 9,916,177 | B2* | 3/2018 | Goncalves de Aguiar | |
| | | | | G06F 11/3442 |
| 10,261,891 | B2* | 4/2019 | Rajagopalan | G06F 11/3676 |
| 10,747,544 | B1* | 8/2020 | Balasubramanian | |
| | | | | G06F 11/079 |
| 11,169,815 | B2* | 11/2021 | Ali | G06F 9/4401 |
| 11,221,907 | B1* | 1/2022 | Sharma | G06F 11/0793 |
| 2006/0064481 | A1* | 3/2006 | Baron | H04L 41/5019 |
| | | | | 709/224 |
| 2009/0307526 | A1* | 12/2009 | Ohira | G06F 11/0724 |
| | | | | 714/10 |
| 2010/0094676 | A1* | 4/2010 | Perra | G06Q 10/06 |
| | | | | 705/7.41 |
| 2012/0084615 | A1* | 4/2012 | Ozawa | G06F 11/0793 |
| | | | | 714/E11.023 |
| 2016/0352608 | A1* | 12/2016 | Cornell | H04L 43/0817 |
| 2017/0052814 | A1* | 2/2017 | Aguiar | G06F 11/3442 |
| 2019/0205166 | A1* | 7/2019 | LaChiusa | G06F 11/3055 |
| 2019/0324831 | A1* | 10/2019 | Gu | G06F 11/0775 |
| 2020/0090087 | A1* | 3/2020 | Singh | H04L 67/306 |
| 2020/0134069 | A1* | 4/2020 | Chennen | G06F 18/24 |
| 2020/0192743 | A1* | 6/2020 | Harper | G06F 11/0793 |
| 2020/0341888 | A1* | 10/2020 | Sridhar | G06F 11/3692 |
| 2020/0409825 | A1* | 12/2020 | Balasubramanian | |
| | | | | G06F 16/90335 |
| 2020/0409831 | A1* | 12/2020 | Balasubramanian | |
| | | | | G06F 11/3476 |
| 2021/0303381 | A1* | 9/2021 | Baldassarre | G06F 11/008 |
| 2022/0050766 | A1* | 2/2022 | Tate | G06F 9/54 |
| 2022/0066852 | A1* | 3/2022 | Ramanujan | G06F 11/0793 |
| 2022/0109696 | A1* | 4/2022 | Deshmukh | H04L 43/045 |
| 2022/0206880 | A1* | 6/2022 | Thota | G06F 21/31 |
| 2022/0276949 | A1* | 9/2022 | Tate | G06F 11/3608 |
| 2022/0292012 | A1* | 9/2022 | Amin | G06F 11/3676 |
| 2022/0327012 | A1* | 10/2022 | Roy | G06F 11/0769 |
| 2022/0360621 | A1* | 11/2022 | Tripathy | H04L 67/025 |
| 2022/0374263 | A1* | 11/2022 | Ban | G06F 11/079 |

FOREIGN PATENT DOCUMENTS

| | | | | |
|---|---|---|---|---|
| WO | WO-2015161236 A1 * | 10/2015 | ......... | G06F 11/3055 |
| WO | WO-2020069218 A1 * | 4/2020 | ......... | G06F 11/0751 |
| WO | WO-2021107918 A1 * | 6/2021 | ......... | G06F 11/0709 |

* cited by examiner

SYSTEMS AND METHODS TO IDENTIFY PRODUCTION INCIDENTS AND PROVIDE AUTOMATED PREVENTIVE AND CORRECTIVE MEASURES

TECHNICAL FIELD

This disclosure generally relates to application development and production management, and, more particularly, to systems and methods for identifying production incidents and implementing automated preventive and corrective measures along with chain reaction application or systems.

BACKGROUND

As software application becomes increasingly more complex, development, testing, and production of such software application also becomes more complex as a large number of unique combinations of paths and modules may be tested for each program. Conventional tools exist for software application development, testing, and production. However, excessive manual effort may be required in the development and production management teams, which may prove to be error prone (i.e., human errors related to the manual work in the incident and event management life-cycles) and extremely time consuming.

Today, large enterprises, corporations, agencies, institutions, and other organizations are facing a continuing problem of addressing production issues related to the applications in a quick, expedited, accurate, and meaningful manner. Typically, production support and developers collaborate to solve production issues. In most cases, the steps taken for resolution are repetitive in nature across various data flow jobs, but the fluency to apply them relies on domain knowledge which may be challenging to extract from run books. Separation of duties is another contributor to fragmentation in performing recovery activities. This compounds in large batch environments with a myriad of dependencies. For example, today's manual resolution of production issues may involve the following processes (failure scenario I): data flow job fails in production and is sent to L2 queue (i.e., production support); production support leverages recovery instructions defined in the run book to resolve the issue; if not able to address the issue, reaches out to developers; developers identify the root cause and pass the instructions to production support to re-run the job(s), thereby adding significant delay in resolving production issues. Today's manual resolution of production issues may also involve the following processes (failure scenario II): data flow job fails in production and is sent to L2 queue (i.e. production support); due to data quality issues with upstream systems or new functionality for things such as history loads, developers send ad-hoc requests to production support engineers to trigger data flow jobs in a specific order, thereby adding significant delay in resolving production issues.

While conventional tools may help address some of the problem, there may be a need for an automation approach than these conventional approaches to improve the overall time to resolve (TTR) metric and to reduce production issues.

SUMMARY

The present disclosure, through one or more of its various aspects, embodiments, and/or specific features or sub-components, may provide, among other features, various systems, servers, devices, methods, media, programs, and platforms for implementing an automation module that triggers self-healing followed by self-service processes, thereby significantly improving TTR to resolve across all ticket priorities and close any ticket in an expeditious manner compared to conventional approach, reducing incidents in production overall (i.e., reducing job failure to ~0.x. % and reducing P4 tickets by 50%), and reducing developer time in dealing with production issues (i.e., 90% of incidents is handled by automation (L1 queue) and production support partners (L2 queue)), but the disclosure is not limited thereto.

For example, the present disclosure, through one or more of its various aspects, embodiments, and/or specific features or sub-components, may also provide, among other features, various systems, servers, devices, methods, media, programs, and platforms for implementing an automation module that provides restructuring of data flows to issue granular error codes that enable hooks into automation templates (developers describe in configuration what should happen for known error codes), an automation user interface (UI) to allow developers to manipulate production flows within an scheduler without support from production engineers, close collaboration between development and production support to evolve monitoring processes and tooling across the ecosystem, but the disclosure is not limited thereto.

According to an aspect of the present disclosure, a method for identifying production incidents and implementing automated preventive and corrective measures by utilizing one or more processors and one or more memories is disclosed. The method may include: generating an event corresponding to a job failure or service degradation; generating, by the event, an incident in an automation queue; automatically triggering, in response to the generated incident, a self-healing service that may include: identifying an application to which the event generated belongs to by accessing a database that stores the application and host details; fetching functional identification (ID) of the application from the database, wherein the functional ID allows access to production servers to perform required mitigation steps; identifying the type of job failure or service degradation; automatically executing, by utilizing predefined micro services, the steps required for mitigation; recording, in response to executing, outcome of the mitigation in the database along with output at each stage of execution; and evaluating the outcome of the mitigation by executing health checks using micro services to determine whether the failed job or process or host is healthy; and closing the incident based on determining that the failed job or process or host is healthy.

According to another aspect of the present disclosure, wherein, when it is determined that the failed job or process or host is not healthy, the method may further include: transferring the incident to operations team for manual execution; manually executing the steps required for mitigation; and closing the incident.

According to yet another aspect of the present disclosure, the method may further include: automatically redirecting all data flow job failures to a central self-healing queue; executing next best actions based on preconfigured error codes; and automatically triggering the self-healing service to minimize human intervention in taking agreed upon design actions around the data flow jobs.

According to a further aspect of the present disclosure, the method may further include: automatically transferring the incident to upstream for known batch issues; and automatically handling of infrastructure incident with documented remediation steps, wherein the known batch issues may include file delay and incompatible schema for any scheduler, but the disclosure is not limited thereto.

According to an additional aspect of the present disclosure, the method may further include: capturing list of errors and actions for correction; creating scheduler configuration files for jobs in scope; automating planned platform maintenance; and utilizing scheduler capabilities to trigger updates of set quantitative resource limits and control jobs concurrency or run timeframes.

According to yet another aspect of the present disclosure, the method may further include: automatically validating and deploying the scheduler configuration files to enable real time changes in job flow execution.

According to a further aspect of the present disclosure, the method may further include: automatically holding batch jobs during deployment and maintenance windows; automatically restarting servers and processes post deployment where needed for platform dependencies; and avoiding incident creation for jobs that succeed on retries.

According to an aspect of the present disclosure, a system for identifying production incidents and implementing automated preventive and corrective measures is disclosed. The system may include a database that stores applications and host details; and a processor operatively coupled to the database via a communication network. The processor may be configured to: generate an event corresponding to a job failure or service degradation; generate, by the event, an incident in an automation queue; automatically trigger, in response to the generated incident, a self-healing service that may include: identifying an application to which the event generated belongs to by accessing the database; fetching functional identification (ID) of the application from the database, wherein the functional ID allows access to production servers to perform required mitigation steps; identifying the type of job failure or service degradation; automatically executing, by utilizing predefined micro services, the steps required for mitigation; recording, in response to executing, outcome of the mitigation in the database along with output at each stage of execution; and evaluating the outcome of the mitigation by executing health checks using micro services to determine whether the failed job or process or host is healthy; and close the incident based on determining that the failed job or process or host is healthy.

According to another aspect of the present disclosure, wherein, when it is determined that the failed job or process or host is not healthy, the processor may be further configured to: transfer the incident to operations team for manual execution; manually execute the steps required for mitigation; and close the incident.

According to yet another aspect of the present disclosure, the processor may be further configured to: automatically redirect all data flow job failures to a central self-healing queue; execute next best actions based on preconfigured error codes; and automatically trigger the self-healing service to minimize human intervention in taking agreed upon design actions around the data flow jobs.

According to a further aspect of the present disclosure, the processor may be further configured to: automatically transfer the incident to upstream for known batch issues; and automatically handle of infrastructure incident with documented remediation steps, wherein the known batch issues may include file delay and incompatible schema for any scheduler, but the disclosure is not limited thereto.

According to an additional aspect of the present disclosure, the processor may be further configured to: capture list of errors and actions for correction; create scheduler configuration files for jobs in scope; automate planned platform maintenance; and utilize scheduler capabilities to trigger updates of set quantitative resource limits and control jobs concurrency or run timeframes.

According to yet another aspect of the present disclosure, the processor may be further configured to: automatically validate and deploy the scheduler configuration files to enable real time changes in job flow execution.

According to a further aspect of the present disclosure, the processor may be further configured to: automatically hold batch jobs during deployment and maintenance windows; automatically restart servers and processes post deployment where needed for platform dependencies; and avoid incident creation for jobs that succeed on retries.

According to an aspect of the present disclosure, a non-transitory computer readable medium configured to store instructions for identifying production incidents and implementing automated preventive and corrective measures is disclosed. The instructions, when executed, may cause a processor to perform the following: generating an event corresponding to a job failure or service degradation; generating, by the event, an incident in an automation queue; automatically triggering, in response to the generated incident, a self-healing service that may include: identifying an application to which the event generated belongs to by accessing a database that stores the application and host details; fetching functional identification (ID) of the application from the database, wherein the functional ID allows access to production servers to perform required mitigation steps; identifying the type of job failure or service degradation; automatically executing, by utilizing predefined micro services, the steps required for mitigation; recording, in response to executing, outcome of the mitigation in the database along with output at each stage of execution; and evaluating the outcome of the mitigation by executing health checks using micro services to determine whether the failed job or process or host is healthy; and closing the incident based on determining that the failed job or process or host is healthy.

According to another aspect of the present disclosure, wherein, when it is determined that the failed job or process or host is not healthy, the instructions, when executed, may cause the processor to further perform the following: transferring the incident to operations team for manual execution; manually executing the steps required for mitigation; and closing the incident.

According to yet another aspect of the present disclosure, wherein the instructions, when executed, may cause the processor to further perform the following: automatically redirecting all data flow job failures to a central self-healing queue; executing next best actions based on preconfigured error codes; and automatically triggering the self-healing service to minimize human intervention in taking agreed upon design actions around the data flow jobs.

According to a further aspect of the present disclosure, wherein the instructions, when executed, may cause the processor to further perform the following: automatically transferring the incident to upstream for known batch issues; and automatically handling of infrastructure incident with documented remediation steps, wherein the known batch issues may include file delay and incompatible schema for any scheduler, but the disclosure is not limited thereto.

According to an additional aspect of the present disclosure, wherein the instructions, when executed, may cause the processor to further perform the following: capturing list of errors and actions for correction; creating scheduler configuration files for jobs in scope; automating planned platform maintenance; and utilizing scheduler capabilities to trigger updates of set quantitative resource limits and control jobs concurrency or run timeframes.

According to yet another aspect of the present disclosure, wherein the instructions, when executed, may cause the processor to further perform the following: automatically validating and deploying the scheduler configuration files to enable real time changes in job flow execution.

According to a further aspect of the present disclosure, wherein the instructions, when executed, may cause the processor to further perform the following: automatically holding batch jobs during deployment and maintenance windows; automatically restarting servers and processes post deployment where needed for platform dependencies; and avoiding incident creation for jobs that succeed on retries.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
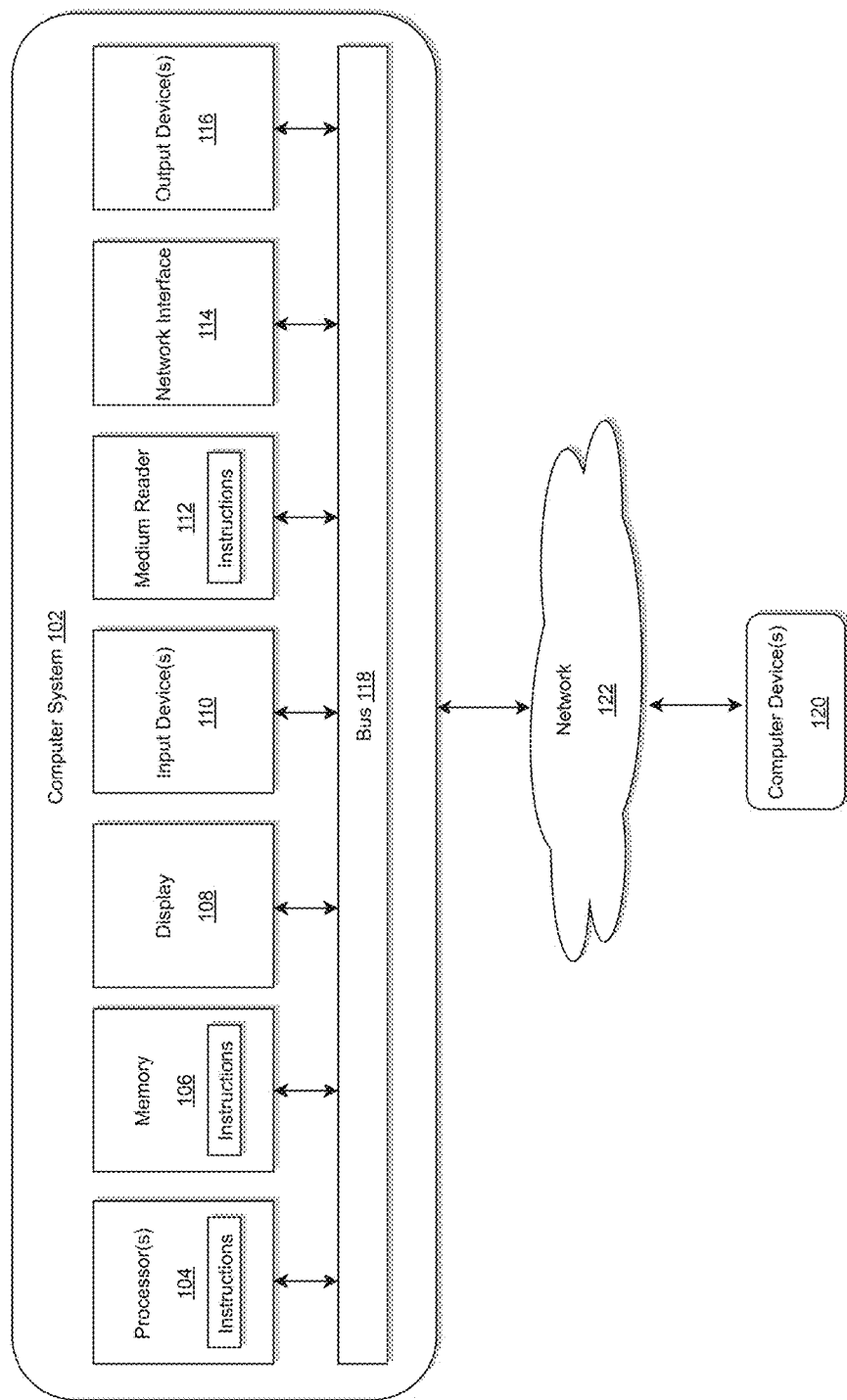
FIG. 1 illustrates a computer system for implementing an automation device for identifying production incidents and implementing automated preventive and corrective measures in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines and/or modules. Those skilled in the art will appreciate that these blocks, units, engines, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, and/or modules being implemented by microprocessors or similar, they may be programmed using software (e.g., microcode) to perform various functions discussed herein and may optionally be driven by firmware and/or software. Alternatively, each block, unit, engine, and/or module may be implemented by dedicated hardware, or as a combination of dedicated hardware to perform some functions and a processor (e.g., one or more programmed microprocessors and associated circuitry) to perform other functions. Also, each block, unit, engine, and/or module of the example embodiments may be physically separated into two or more interacting and discrete blocks, units, engines, and/or modules without departing from the scope of the inventive concepts. Further, the blocks, units, engines, and/or modules of the example embodiments may be physically combined into more complex blocks, units, engines, and/or modules without departing from the scope of the present disclosure.

FIG. 1 is an exemplary system for use in implementing an automation device for identifying production incidents and implementing automated preventive and corrective measures in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (CPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automation module that triggers self-healing followed by self-service processes, thereby significantly improving TTR to resolve across all ticket priorities and close any ticket in an expeditious manner compared to conventional approach, reducing incidents in production overall (i.e., reducing job failure to ~0.x. % and reducing P4 tickets by 50%), and reducing developer time in dealing with production issues (i.e., 90% of incidents is handled by automation (L1 queue) and production support partners (L2 queue)), but the disclosure is not limited thereto.

Figure 2:
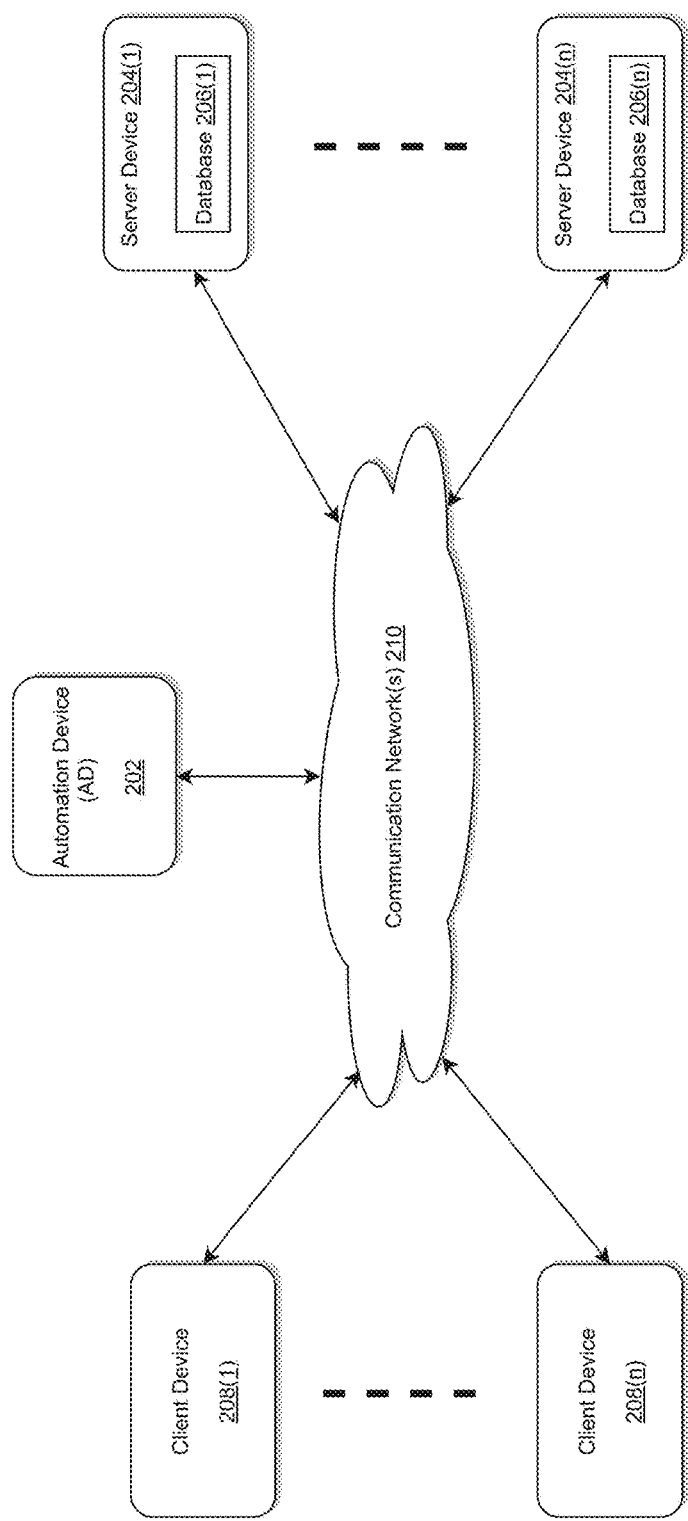
FIG. 2 illustrates an exemplary diagram of a network environment with an automation device of FIG. 1 in accordance with an exemplary embodiment.

Referring to FIG. 2, a schematic of an exemplary network environment 200 for implementing an automation device of the instant disclosure is illustrated.

According to exemplary embodiments, the above-described problems associated with conventional methods and systems may be overcome by implementing an AD 202 as illustrated in FIG. 2 by implementing an automation module (i.e., self-healing solution module) that triggers self-healing followed by self-service processes, thereby significantly improving TTR to resolve across all ticket priorities and close any ticket in an expeditious manner compared to conventional approach, reducing incidents in production overall (i.e., reducing job failure to ~0.x. % and reducing P4 tickets by 50%), and reducing developer time in dealing with production issues (i.e., 90% of incidents is handled by automation (L1 queue) and production support partners (L2 queue)), but the disclosure is not limited thereto.

The AD 202 may be the same or similar to the computer system 102 as described with respect to FIG. 1.

The AD 202 may store one or more applications that can include executable instructions that, when executed by the AD 202, cause the AD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AD 202 itself, may be located in virtual server(s) running in a cloud-based computing environment rather than being tied to one or more specific physical network computing devices. Also, the application(s) may be running in one or more virtual machines (VMs) executing on the AD 202. Additionally, in one or more embodiments of this technology, virtual machine(s) running on the AD 202 may be managed or supervised by a hypervisor.

In the network environment 200 of FIG. 2, the AD 202 is coupled to a plurality of server devices 204(1)-204(n) that hosts a plurality of databases 206(1)-206(n), and also to a plurality of client devices 208(1)-208(n) via communication network(s) 210. A communication interface of the AD 202, such as the network interface 114 of the computer system 102 of FIG. 1, operatively couples and communicates between the AD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AD 202 may be a standalone device or integrated with one or more other devices or apparatuses, such as one or more of the server devices 204(1)-204(n), for example. In one particular example, the AD 202 may be hosted by one of the server devices 204(1)-204(n), and other arrangements are also possible. Moreover, one or more of the devices of the AD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AD 202 that may be configured for implementing an automation module that triggers self-healing followed by self-service processes, thereby significantly improving TTR to resolve across all ticket priorities and close any ticket in an expeditious manner compared to conventional approach, reducing incidents in production overall (i.e., reducing job failure to ~0.x. % and reducing P4 tickets by 50%), and reducing developer time in dealing with production issues (i.e., 90% of incidents is handled by automation (L1 queue) and production support partners (L2 queue)), but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the AD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AD 202, the server devices 204(1)-204(n), or the client devices 208(1)-208(n), for example, may be configured to operate as virtual instances on the same physical machine. For example, one or more of the AD 202, the server devices 204(1)-204(n), or the client devices 208(1)-208(n) may operate on the same physical device rather than as separate devices communicating through communication network(s) 210. Additionally, there may be more or fewer ADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
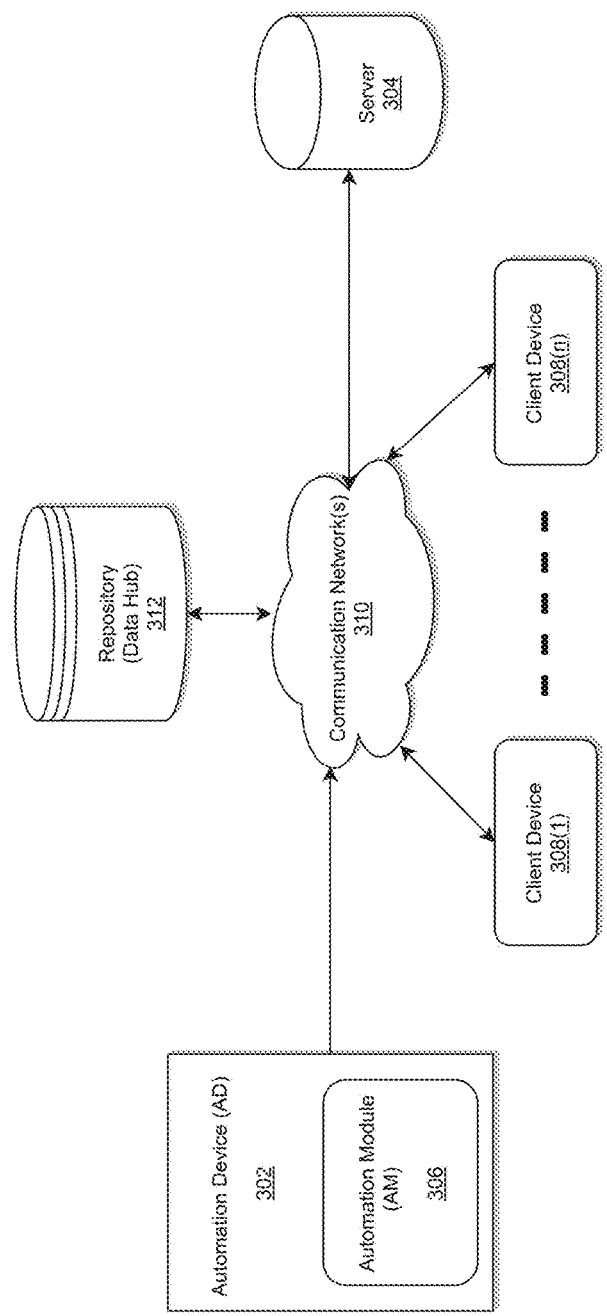
FIG. 3 illustrates a system diagram for implementing an automation device with an automation module for identifying production incidents and implementing automated preventive and corrective measures in accordance with an exemplary embodiment.

FIG. 3 illustrates a system diagram 300 for implementing an automation device (AD) with an automation module (AM) for identifying production incidents and implementing automated preventive and corrective measures in accordance with an exemplary embodiment.

As illustrated in FIG. 3, the AD 302 including the AM 306 may be connected to a server 304, and a repository (e.g., data hub) 312 via a communication network 310, but the disclosure is not limited thereto. Although only one repository 312 is illustrated in FIG. 3, it should be noted that any desired number of repositories may be utilized by the AM 306. The repository 312 may store one or more applications and host details, but the disclosure is not limited thereto.

The AD 302 may also be connected to a plurality of client devices 308(1)-308(n) via the communication network 310, but the disclosure is not limited thereto. According to exemplary embodiments, the AM 306 may be implemented within the client devices 308(1)-308(n), but the disclosure is not limited thereto. According to exemplary embodiments, the client devices 308(1)-308(n) may be utilized for implementing the AM 306, but the disclosure is not limited thereto.

According to exemplary embodiment, the AD 302 is described and shown in FIG. 3 as including the AM 306, although it may include other rules, policies, modules, databases, or applications, for example. According to exemplary embodiments, the repository 312 may be embedded within the AD 302. The repository 312, via the server 304, may include one or more memories configured to store login information, data files, data content, etc., but the disclosure is not limited thereto. According to exemplary embodiments, the AM 306 may be configured to be storage platform agnostic—configured to be deployed across multiple storage layers.

According to exemplary embodiments, the AM 306 may be configured to receive continuous feed of data from the repository 312 and the server 304 via the communication network 310.

As will be described below, the AM 306 may be configured to generate an event corresponding to a job failure or service degradation; generate, by the event, an incident in an automation queue; automatically trigger, in response to the generated incident, a self-healing service that may include: identifying an application to which the event generated belongs to by accessing the repository 312; fetching functional identification (ID) of the application from the repository 312, wherein the functional ID allows access to production servers to perform required mitigation steps; identifying the type of job failure or service degradation; automatically executing, by utilizing predefined micro services, the steps required for mitigation; recording, in response to executing, outcome of the mitigation in the repository 312 along with output at each stage of execution; and evaluating the outcome of the mitigation by executing health checks using micro services to determine whether the failed job or process or host is healthy; and close the incident based on determining that the failed job or process or host is healthy, but the disclosure is not limited thereto.

The plurality of client devices 308(1)-308(n) are illustrated as being in communication with the AD 302. In this regard, the plurality of client devices 308(1)-308(n) may be "clients" of the AD 302 and are described herein as such. Nevertheless, it is to be known and understood that the plurality of client devices 308(1)-308(n) need not necessarily be "clients" of the AD 302, or any entity described in association therewith herein. Any additional or alternative relationship may exist between either or more of the plurality of client devices 308(1)-308(n) and the AD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the AD 302 via broadband or cellular communication. Of course, these embodiments are merely exemplary and are not limiting or exhaustive.

Figure 4:
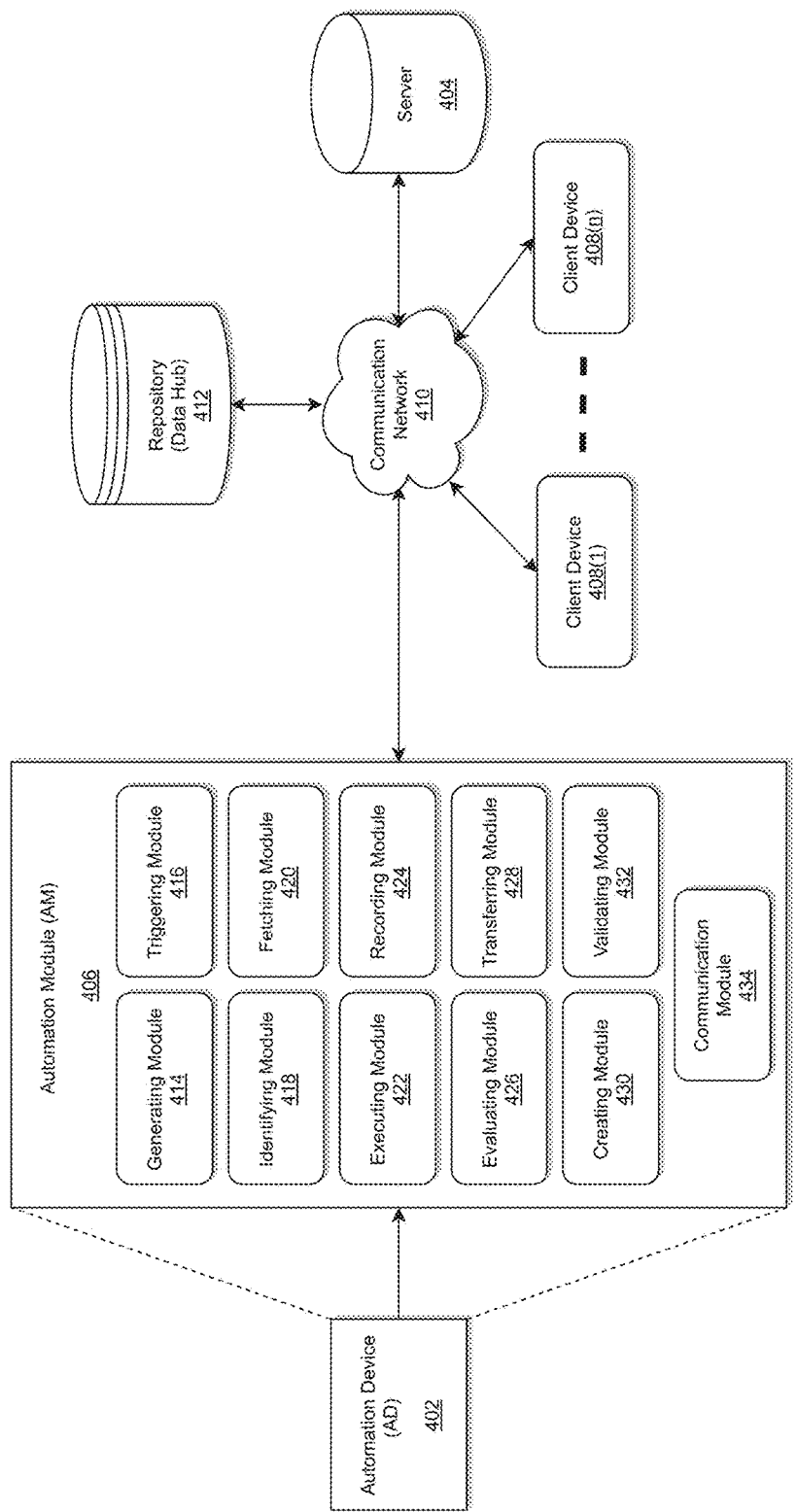
FIG. 4 illustrates a system diagram for implementing an automation module of FIG. 3 in accordance with an exemplary embodiment.

FIG. 4 illustrates a system diagram for implementing an AM of FIG. 3 in accordance with an exemplary embodiment. As illustrated in FIG. 4, the system 400 may include an AD 402 within which an AM 406 may be embedded, a repository (i.e., data hub) 412, a server 404, client devices 408(1)-408(n), and a communication network 410. According to exemplary embodiments, the AD 402, the AM 406, the repository 412, the server 404, the client devices 408(1)-408(n), and the communication network 410 as illustrated in FIG. 4 may be the same or similar to the AD 302, the AM 306, the repository 312, the server 304, the client devices 308(1)-308(n), and the communication network 310, respectively, as illustrated in FIG. 3.

According to exemplary embodiments, although only one repository 412 is illustrated in FIG. 4, it should be noted that any desired number of repositories may be utilized by the AM 406. The repository 412 may store data to be utilized for identifying production incidents and implementing automated preventive and corrective measures in accordance with exemplary embodiments disclosed herein.

As illustrated in FIG. 4, the AM 406 may include a generating module 414, a triggering module 416, an identifying module 418, a fetching module 420, an executing module 422, a recording module 424, an evaluating module 426, a transferring module 428, a creating module 430, a validating module 432, and a communication module 434. According to exemplary embodiments, the repository 412 may be external to the AD 402 may include various systems that are managed and operated by an organization. Alternatively, according to exemplary embodiments, the repository 412 may be embedded within the AD 402 and/or the AM 406.

According to exemplary embodiments, the AM 406 may be implemented via user interfaces, e.g., web user interface, etc., but the disclosure is not limited thereto, and may be integrated with a private cloud platform via the AM 406 and an authentication service, but the disclosure is not limited thereto. The user interface may be operatively connected to a system of record in one end and an open source platform for analytics and dashboard in another end.

The process may be executed via the communication module 434 and the communication network 410, which may comprise plural networks as described above. For example, in an exemplary embodiment, the various components of the AM 406 may communicate with the server 404, and the repository 412 via the communication module 434 and the communication network 410. Of course, these embodiments are merely exemplary and are not limiting or exhaustive.

According to exemplary embodiments, the communication network 410 and the communication module 434 may be configured to establish a link between the repository 412, the client devices 408(1)-408(n), and the AM 406.

According to exemplary embodiments, each of the generating module 414, triggering module 416, identifying module 418, fetching module 420, executing module 422, recording module 424, evaluating module 426, transferring module 428, creating module 430, validating module 432, and the communication module 434, and each of the engines disclosed herein may be implemented by microprocessors or similar, they may be programmed using software (e.g., microcode) to perform various functions discussed herein and may optionally be driven by firmware and/or software. Alternatively, each of the generating module 414, triggering module 416, identifying module 418, fetching module 420, executing module 422, recording module 424, evaluating module 426, transferring module 428, creating module 430, validating module 432, and the communication module 434, and each of the engines disclosed herein may be implemented by dedicated hardware, or as a combination of dedicated hardware to perform some functions and a processor (e.g., one or more programmed microprocessors and associated circuitry) to perform other functions. Also, according to exemplary embodiments, each of the generating module 414, triggering module 416, identifying module 418, fetching module 420, executing module 422, recording module 424, evaluating module 426, transferring module 428, creating module 430, validating module 432, and the communication module 434, and each of the engines disclosed herein may be physically separated into two or more interacting and discrete blocks, units, devices, and/or modules without departing from the scope of the inventive concepts.

According to exemplary embodiments, each of the generating module 414, triggering module 416, identifying module 418, fetching module 420, executing module 422, recording module 424, evaluating module 426, transferring module 428, creating module 430, validating module 432, and the communication module 434 of the AM 406 and each of the engines disclosed herein may be called by corresponding API, but the disclosure is not limited thereto.

Figure 5:
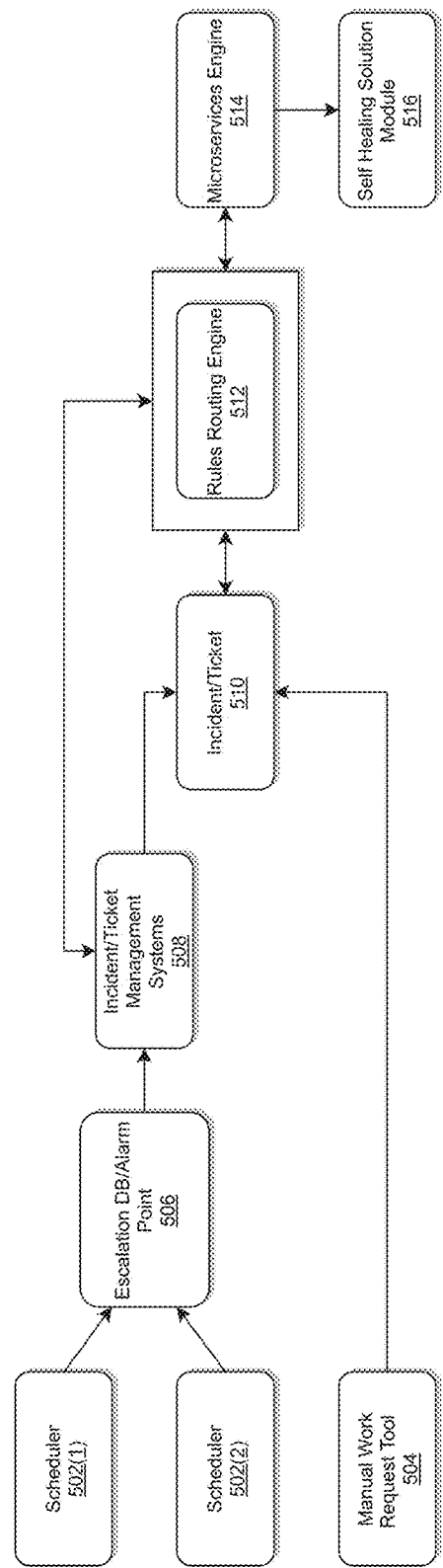
FIG. 5 illustrates an exemplary block diagram of a self-healing workflow of exemplary use cases in accordance with an exemplary embodiment.

FIG. 5 illustrates an exemplary block diagram of a self-healing workflow of exemplary use cases in accordance with an exemplary embodiment.

As illustrated in FIG. 5, the exemplary block diagram 500 may include scheduler 502(1) (i.e., Control M, the disclosure is not limited thereto), scheduler 502(2) (i.e., AutoSys, but the disclosure is not limited thereto), manual work request tool 504, Escalation Dashboard (DB) or alarm point 506, incident/ticket management systems 508 (i.e., network management tool, NETCOOL, etc., but the disclosure is not limited thereto), incident/ticket 510 (i.e., via HP service manager (HPSM)), rules routing engine 512 (i.e., Alert Hub, but the disclosure is not limited thereto), microservices engine 514 (i.e., automation as a service (AAAS) framework, but the disclosure is not limited thereto), and a self-healing solution module 516 for providing custom self-healing solution.

Referring to FIGS. 4 and 5, according to exemplary embodiments, the overall self-healing solution requires integration of different GTI owned applications such as scheduler (Control-M or AutoSys). Escalation DB, NETCOOL, Alert-Hub, and AAAS. As part of this integration, according to exemplary embodiments, the AD 402 sets up peregrine queues, functional IDs, leverages AAAS services for real time intervention and develop/enhance data flows and run books. A non-limiting important aspect of key components in this solution of the instant disclosure is Alert Hub. Alert Hub is an ecosystem of cloud native microservices used to route system generated events to AAAS, NETCOOL (HPSM/React), Email and inter-firm communication.

For example, according to a first exemplary use case, when there is any production job failure, using rules defined in Escalation DB/Alarm point 506, the incident/ticket management system may release NETCOOL alert which then creates HPSM ticket (i.e., incident/ticket 510) appropriately (P2/P3/P4).

According to an alternative second exemplary use case, application engineers may utilize the manual work request tool 504 to create HPSM ticket in L2 queue to run data flow jobs.

According to exemplary embodiments, when there is any production job failure, using rules defined in Escalation DB/Alarm point 506, it releases NETCOOL alert which then creates HPSM ticket (i.e., incident/ticket 510) appropriately (P2/P3/P4).

According to exemplary embodiments, rules may be defined in the rules routing engine 512 (i.e., Alert Hub). These rules are mainly around what services to invoke based on the notifications coming from the NETCOOL. The microservices engine 514 (i.e., AAAS framework) may invoke respective self-healing solutions based on the errors.

Referring to FIGS. 4 and 5, exemplary details of the self-healing solutions will be described below in accordance with non-limiting exemplary embodiments.

According to exemplary embodiments, the generating module 414 may be configured to generate an event corresponding to a job/host failure or service degradation, and generate, by the event, an incident in an automation queue. The triggering module 416 may automatically trigger, in response to the generated incident, a self-healing service implemented by the AM 406/self-healing solution module 516.

In implementing the self-healing service, according to exemplary embodiments, the identifying module 418 may identify an application to which the event generated belongs to by accessing the database. The fetching module 420 may fetch functional identification (ID) of the application from the repository 412, wherein the functional ID allows access to production servers to perform required mitigation steps. The identifying module 418 may also identify the type of job/host failure or service degradation. The executing module 422 may automatically execute, by utilizing predefined micro services, the steps required for mitigation. The recording module 424 may record, in response to executing, outcome of the mitigation in the repository 412 along with output at each stage of execution. According to exemplary embodiments, the evaluating module 426 may evaluate the outcome of the mitigation by executing health checks using micro services to determine whether the failed job or process or host is healthy. The AM 406/self-healing solution module 516 may close the incident based on determining that the failed job or process or host is healthy.

According to exemplary embodiments, wherein, when it is determined that the failed job or process or host is not healthy, the AM 406/self-healing solution module 516 may be further configured to: transfer, by utilizing the transferring module 428, the incident to operations team for manual execution. The operations team may manually execute the steps required for mitigation and close the incident.

According to exemplary embodiments, the AM 406/self-healing solution module 516 may automatically redirect all data flow job failures to a central self-healing queue. The executing module 422 may execute next best actions based on preconfigured error codes; and the triggering module 416 may automatically trigger the self-healing service to minimize human intervention in taking agreed upon design actions around the data flow jobs. According to exemplary embodiments, the self-healing service may refer to common errors and next best actions documented in JSON file.

According to exemplary embodiments, the transferring module 428 may automatically transfer the incident to upstream for known batch issues. The executing module 422 may automatically handle of infrastructure incident with documented remediation steps, wherein the known batch issues may include file delay and incompatible schema for any scheduler, but the disclosure is not limited thereto.

According to exemplary embodiments, the AM 406/self-healing solution module 516 may capture list of errors and actions for correction. The creating module 430 may create scheduler configuration files for jobs in scope. The executing module 422 may automate planned platform maintenance and utilize scheduler capabilities to trigger updates of set quantitative resource limits and control jobs concurrency or run timeframes.

According to exemplary embodiments, the validating module 432 may automatically validate and deploy the scheduler configuration files to enable real time changes in job flow execution.

According to exemplary embodiments, the AM 406/self-healing solution module 516 may automatically hold batch jobs during deployment and maintenance windows; automatically restart servers and processes post deployment where needed for platform dependencies; and avoid incident creation for jobs that succeed on retries.

Figure 6:
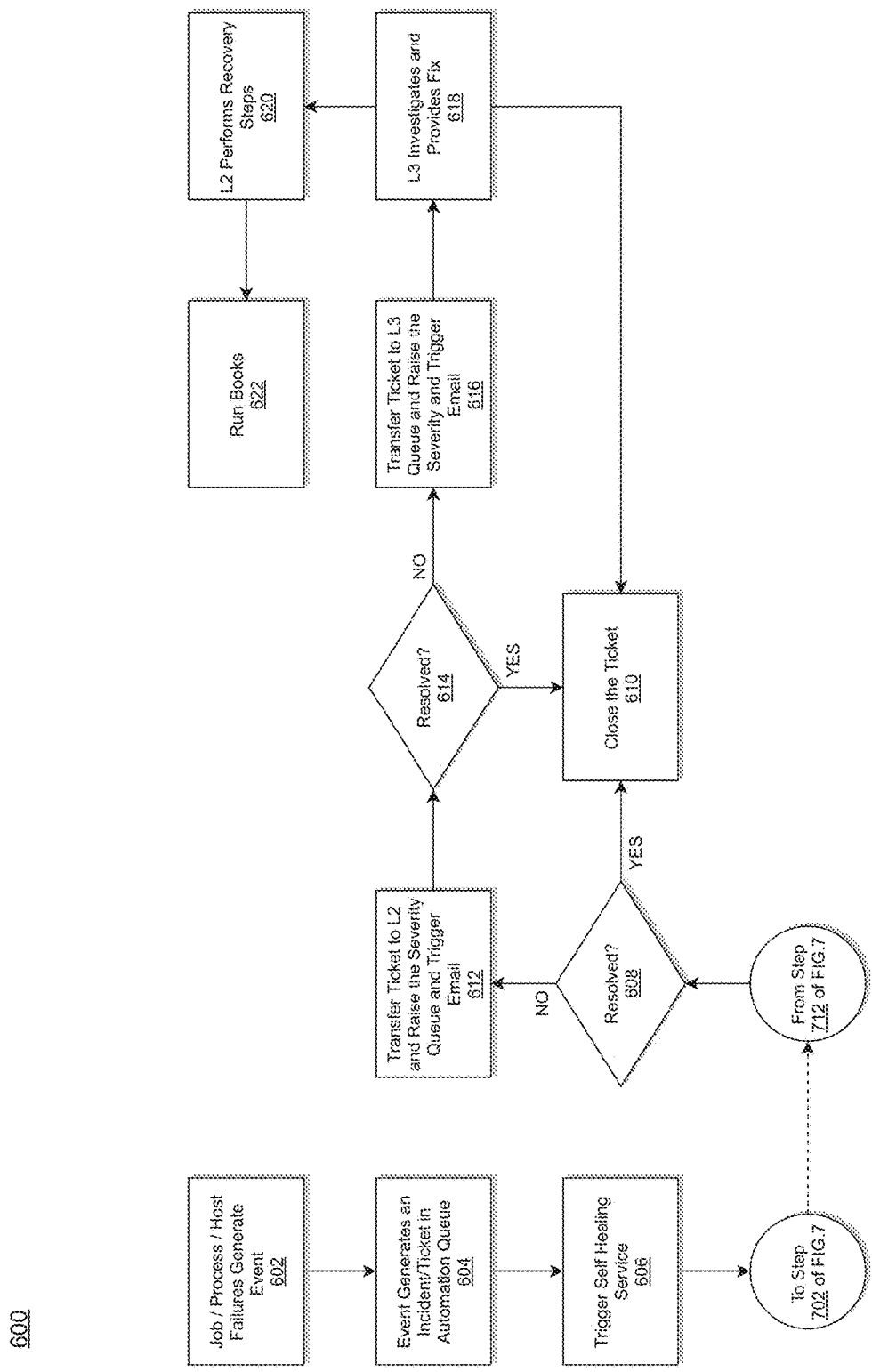
FIG. 6 illustrates a flow diagram of a self-healing workflow that implements a self-healing service executed by the self-healing solution module of FIG. 5 in accordance with an exemplary embodiment.

FIG. 6 illustrates a flow diagram of a self-healing workflow that implements a self-healing service executed by the self-healing solution module 516 of FIG. 5 in accordance with an exemplary embodiment.

In the process 600 of FIG. 6, at step 602, job/process/host failures may generate an event. At step 604, the event generates an incident/ticket in automation queue. At step 606, self-healing service may be automatically triggered by utilizing a self-healing engine in response to generation of the incident/ticket in automation queue. The self-healing engine leverages knowledge error database repository (i.e., repository 412) to apply fix.

Figure 7:
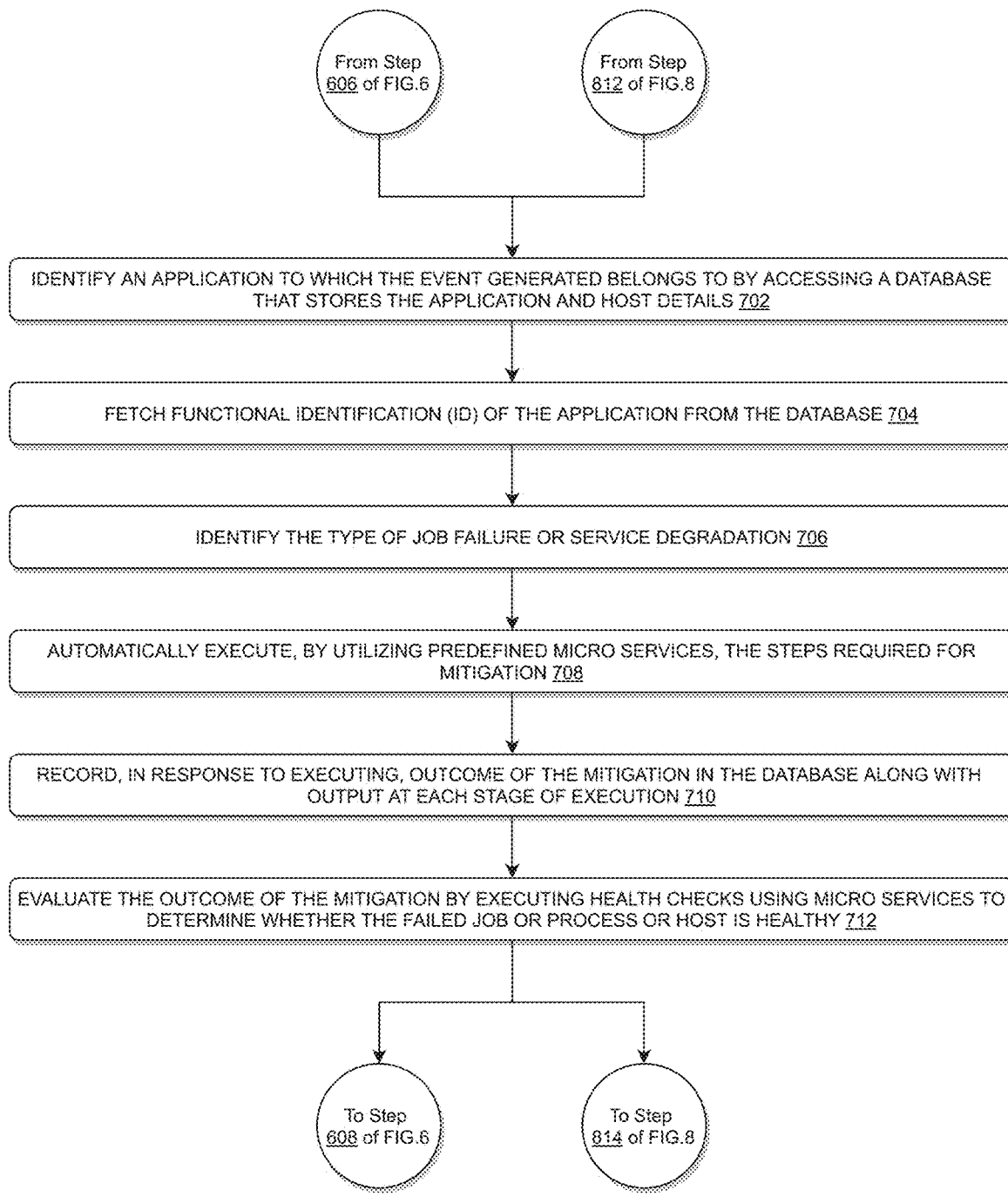
FIG. 7 illustrates a flow diagram of a self-healing service in accordance with an exemplary embodiment.

FIG. 7 illustrates a flow diagram of a self-healing service in accordance with an exemplary embodiment.

For example, at step 702, the process 700 of a self-healing service may include: identifying an application to which the event generated belongs to by accessing the repository 412 that stores the application and host details.

At step 704, the process 700 of a self-healing service may include: fetching functional identification (ID) of the application from the database, wherein the functional ID allows access to production servers to perform required mitigation steps.

At step 706, the process 700 of a self-healing service may include: identifying the type of job failure or service degradation (e.g., JVM issue, host down, CPU spike, Memory issue, batch issue, etc., but the disclosure is not limited thereto). Functional ID will login into the host and pull required error logs (Micro services will be used for this). At step 706, the process 700 may further include: recording the event details, error log for the event, host name and application name in the automation database (i.e., repository 412); comparing the error log with KEDR (Known Error Data Repository) or Run Book; and fetching required steps for mitigation of the issue.

Appendix A, which has been incorporated herewith in its entirety by reference, illustrates, according to exemplary embodiments, KEDR data model.

For example. Appendix A includes an error_log table. Whenever there is any error part of the application, error log service, looks at the error and its details in error log file and extracts the exact error message and error key phrase and ingests the data into the error_log table illustrated in Appendix A. This table may also have application ID along with which job raised the error. This is used as input to find out most impactful errors within application or across the applications.

Appendix A also includes an error_details table. This is the table which holds the instructions on when there is an error at job level or application level, then what actions to trigger. This table can be configured to capture errors at the data flow job level or an application level.

Appendix A also includes an error_action_details table. This table holds what action to take when there is error with detailed instructions.

Appendix A also includes an error_details_instance table. This table holds complete audit trail along with key identifier that can refer to either commercial system to track or home grown system to track the detailed instructions along with error Logs. With this table, one can even find out anomalies around actions. For example, as illustrated in this table, error instance identifier '202009111235 took long time to complete the action.

At step 708, the process 700 of a self-healing service may include: automatically executing, by utilizing predefined micro services, the steps required for mitigation.

At step 710, the process 700 of a self-healing service may include: recording, in response to executing, outcome of the mitigation in the repository 412 along with output at each stage of execution. According to exemplary embodiments, steps can be restarting process, copying files from one host to another, restarting jobs etc., but the disclosure is not limited thereto.

At step 712, the process 700 of a self-healing service may include: evaluating the outcome of the mitigation by executing health checks using micro services to determine whether the failed job or process or host is healthy.

Referring back to FIG. 6, at step 608, it is determined whether the outcome of the mitigation was successful or not. If it was determined in step 608 that the outcome of the mitigation was successful, at step 610, the ticket is closed and an email confirmation is sent to the user.

If it was determined in step 608 that the outcome of the mitigation was not successful, at step 612, the ticket is transferred to L2 (i.e., production support) and the severity queue is raised and an email is triggered to the production support for manual resolution. At step 614, it is again determined whether the error is fixed or not. If it was determined in step 614 that the error is fixed, at step 610, the ticket is closed and an email confirmation is sent to the user.

If it was determined in step 614 that the error is not fixed, at step 616, the ticket is transferred to L3 queue and the severity is raised and an email is triggered to the L3 for further help. At step 618, L3 investigates and provides fix to L2. At step 620, L2 performs recovery steps based on the fix provided by the L3. At step 622, the run books is updated based on the fix.

Figure 8:
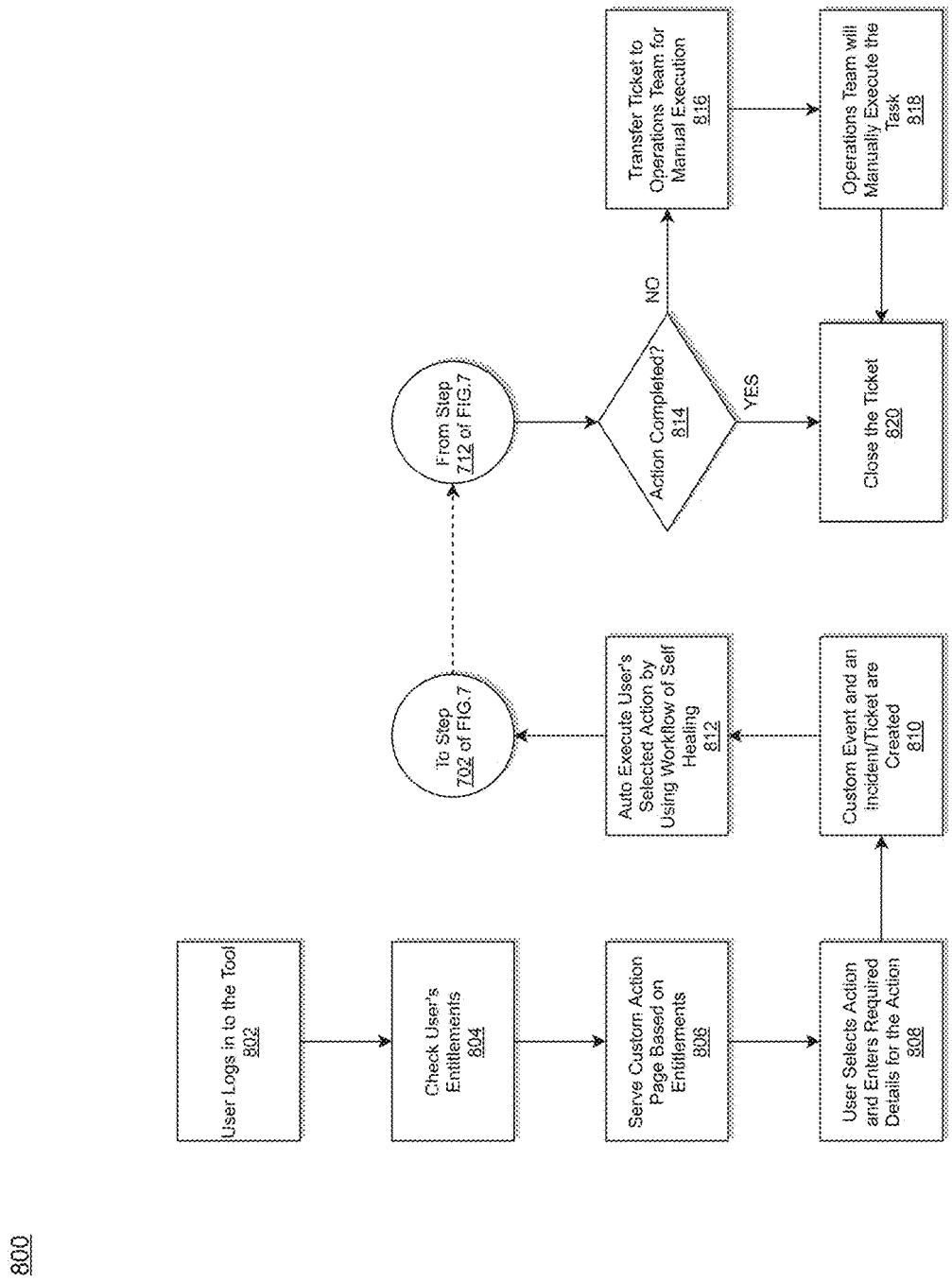
FIG. 8 illustrates a flow diagram of an automation-user interface (UI) workflow that implements a self-healing service executed by the self-healing solution module of FIG. 5 in accordance with an exemplary embodiment.

FIG. 8 illustrates a flow diagram of an automation-user interface (UI) workflow that implements a self-healing service executed by the self-healing solution module 516 of FIG. 5 in accordance with an exemplary embodiment.

In the process 800, at step 802, a user logs in to the automation device (i.e., tool). At step 804, user's entitlements are checked. At step 806, custom action page is served based on the entitlements. At step 808, the user selects action and enters required details for the action. At step 810, custom event and an incident/ticket are created. At step 812, user's selected action is auto executed by using workflow of self-healing as disclosed above with respect to FIG. 7. At step 814, it is determined whether the action is completed. If it is determined at step 814 that the action is completed, at step 820, the incident/ticket is closed. If it is determined at step 814 that the action is not completed, at step 816, the incident/ticket is transferred to operations team for manual execution. At step 818, the operations team will manually execute the task. At step 820, the ticket is closed after manually executing the task.

According to exemplary embodiments, the process 600, 700, 800 may further include: automatically redirecting all data flow job failures to a central self-healing queue; executing next best actions based on preconfigured error codes; and automatically triggering the self-healing service to minimize human intervention in taking agreed upon design actions around the data flow jobs.

According to exemplary embodiments, the process 600, 700, 800 may further include: automatically transferring the incident to upstream for known batch issues; and automatically handling of infrastructure incident with documented remediation steps, wherein the known batch issues may include file delay and incompatible schema for any scheduler, but the disclosure is not limited thereto.

According to exemplary embodiments, the process 600, 700, 800 may further include: capturing list of errors and actions for correction; creating scheduler configuration files for jobs in scope; automating planned platform maintenance; and utilizing scheduler capabilities to trigger updates of set quantitative resource limits and control jobs concurrency or run timeframes.

According to exemplary embodiments, the process 600, 700, 800 may further include: automatically validating and deploying the scheduler configuration files to enable real time changes in job flow execution.

According to exemplary embodiments, the process 600, 700, 800 may further include: automatically holding batch jobs during deployment and maintenance windows; automatically restarting servers and processes post deployment where needed for platform dependencies; and avoiding incident creation for jobs that succeed on retries.

According to exemplary embodiments, the AD 402 may include a memory (e.g., a memory 106 as illustrated in FIG. 1) which may be a non-transitory computer readable medium that may be configured to store instructions for implementing an AM 406 for identifying production incidents and implementing automated preventive and corrective measures as disclosed herein. The AD 402 may also include a medium reader (e.g., a medium reader 112 as illustrated in FIG. 1) which may be configured to read any one or more sets of instructions, e.g., software, from any of the memories described herein. The instructions, when executed by a processor embedded within the AM 406 or within the AD 402, may be used to perform one or more of the methods and processes as described herein. In a particular embodiment, the instructions may reside completely, or at least partially, within the memory 106, the medium reader 112, and/or the processor 104 (see FIG. 1) during execution by the AD 402.

For example, the instructions, when executed, may cause the processor 104 to perform the following: generating an event corresponding to a job failure or service degradation; generating, by the event, an incident in an automation queue; automatically triggering, in response to the generated incident, a self-healing service that may include: identifying an application to which the event generated belongs to by accessing a database that stores the application and host details; fetching functional identification (ID) of the application from the database, wherein the functional ID allows access to production servers to perform required mitigation steps; identifying the type of job failure or service degradation; automatically executing, by utilizing predefined micro services, the steps required for mitigation; recording, in response to executing, outcome of the mitigation in the database along with output at each stage of execution; and evaluating the outcome of the mitigation by executing health checks using micro services to determine whether the failed job or process or host is healthy; and closing the incident based on determining that the failed job or process or host is healthy.

According to exemplary embodiments, the instructions, when executed, may cause the processor 104 to further perform the following: automatically redirecting all data flow job failures to a central self-healing queue; executing next best actions based on preconfigured error codes; and automatically triggering the self-healing service to minimize human intervention in taking agreed upon design actions around the data flow jobs.

According to exemplary embodiments, the instructions, when executed, may cause the processor 104 to further perform the following: automatically transferring the incident to upstream for known batch issues; and automatically handling of infrastructure incident with documented remediation steps, wherein the known batch issues may include file delay and incompatible schema for any scheduler, but the disclosure is not limited thereto.

According to exemplary embodiments, the instructions, when executed, may cause the processor 104 to further perform the following: capturing list of errors and actions for correction; creating scheduler configuration files for jobs in scope; automating planned platform maintenance; and utilizing scheduler capabilities to trigger updates of set quantitative resource limits and control jobs concurrency or run timeframes.

According to exemplary embodiments, the instructions, when executed, may cause the processor 104 to further perform the following: automatically validating and deploying the scheduler configuration files to enable real time changes in job flow execution.

According to exemplary embodiments, the instructions, when executed, may cause the processor 104 to further perform the following: automatically holding batch jobs during deployment and maintenance windows; automatically restarting servers and processes post deployment where needed for platform dependencies; and avoiding incident creation for jobs that succeed on retries.

According to exemplary embodiments as disclosed above in FIGS. 1-8, technical improvements effected by the instant disclosure may include platforms for implementing an automation module that triggers self-healing followed by self-service processes, thereby significantly improving TTR to resolve across all ticket priorities and close any ticket in an expeditious manner compared to conventional approach, reducing incidents in production overall (i.e., reducing job failure to ~0.x. % and reducing P4 tickets by 50%), and reducing developer time in dealing with production issues (i.e., 90% of incidents is handled by automation (L1 queue) and production support partners (L2 queue)), but the disclosure is not limited thereto.

According to exemplary embodiments as disclosed above in FIGS. 1-8, technical improvements effected by the instant disclosure may include platforms for implementing an automation module that provides restructuring of data flows to issue granular error codes that enable hooks into automation templates (developers describe in configuration what should happen for known error codes), an automation user interface (UI) to allow developers to manipulate production flows within an scheduler without support from production engineers, close collaboration between development and production support to evolve monitoring processes and tooling across the ecosystem, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for identifying production incidents and implementing automated preventive and corrective measures by utilizing one or more processors and one or more memories, the method comprising:
    generating an event corresponding to a job failure or service degradation;
    generating, by the event, an incident in an automation queue;
    automatically triggering, in response to the generated incident, a self-healing service that includes:
        identifying an application to which the event generated belongs to by accessing a database that stores the application and host details;
        fetching functional identification (ID) of the application from the database, wherein the functional ID allows access to production servers to perform required mitigation steps;
        identifying a type of job failure or a service degradation;
        automatically executing, by utilizing predefined services, the steps required for mitigation;
        recording, in response to executing, outcome of the mitigation in the database along with output at each stage of execution; and
        evaluating the outcome of the mitigation by executing health checks to determine whether failed job or a process or a host is healthy; and closing the incident based on determining that the failed job or the process or the host is healthy.

2. The method according to claim 1, wherein, when it is determined that the failed job or the process or the host is not healthy, the method further comprising:
transferring the incident to operations team for manual execution;
manually executing the steps required for mitigation; and
closing the incident.

3. The method according to claim 1, further comprising:
automatically redirecting all data flow job failures to a central self-healing queue;
executing next best actions based on preconfigured error codes; and
automatically triggering the self-healing service to minimize human intervention in taking agreed upon design actions around data flow jobs.

4. The method according to claim 1, further comprising:
automatically transferring the incident to upstream for known batch issues; and
automatically handling an infrastructure incident with documented remediation steps.

5. The method according to claim 4, wherein the known batch issues include file delay and incompatible schema for any scheduler.

6. The method according to claim 1, further comprising:
capturing list of errors and actions for correction;
creating scheduler configuration files for jobs in scope;
automating planned platform maintenance; and
utilizing scheduler capabilities to trigger updates of set quantitative resource limits and control jobs concurrency or run timeframes.

7. The method according to claim 6, further comprising:
automatically validating and deploying the scheduler configuration files to enable real time changes in job flow execution.

8. The method according to claim 6, further comprising:
automatically holding batch jobs during deployment and maintenance windows;
automatically restarting servers and processes post deployment where needed for platform dependencies; and
avoiding incident creation for jobs that succeed on retries.

9. A system for identifying production incidents and implementing automated preventive and corrective measures, the system comprising:
a database that stores applications and host details; and
a processor operatively coupled to the database via a communication network, wherein the processor is configured to:
generate an event corresponding to a job failure or service degradation;
generate, by the event, an incident in an automation queue;
automatically trigger, in response to the generated incident, a self-healing service that includes:
identifying an application to which the event generated belongs to by accessing the database;
fetching functional identification (ID) of the application from the database, wherein the functional ID allows access to production servers to perform required mitigation steps;
identifying a type of job failure or a service degradation;
automatically executing, by utilizing predefined services, the steps required for mitigation;
recording, in response to executing, outcome of the mitigation in the database along with output at each stage of execution; and
evaluating the outcome of the mitigation by executing health checks to determine whether failed job or a process or a host is healthy; and
close the incident based on determining that the failed job or the process or the host is healthy.

10. The system according to claim 9, wherein, when it is determined that the failed job or the process or the host is not healthy, the processor is further configured to:
transfer the incident to operations team for manual execution;
manually execute the steps required for mitigation; and
close the incident.

11. The system according to claim 9, wherein the processor is further configured to:
automatically redirect all data flow job failures to a central self-healing queue; execute
next best actions based on preconfigured error codes; and
automatically trigger the self-healing service to minimize human intervention in taking agreed upon design actions around data flow jobs.

12. The system according to claim 9, wherein the processor is further configured to:
automatically transfer the incident to upstream for known batch issues; and
automatically handle an infrastructure incident with documented remediation steps.

13. The system according to claim 12, wherein the known batch issues include file delay and incompatible schema for any scheduler.

14. The system according to claim 9, wherein the processor is further configured to:
capture list of errors and actions for correction;
create scheduler configuration files for jobs in scope;
automate planned platform maintenance; and
utilize scheduler capabilities to trigger updates of set quantitative resource limits and control jobs concurrency or run timeframes.

15. The system according to claim 14, wherein the processor is further configured to:
automatically validate and deploy the scheduler configuration files to enable real time changes in job flow execution.

16. The system according to claim 14, wherein the processor is further configured to:
automatically hold batch jobs during deployment and maintenance windows;
automatically restart servers and processes post deployment where needed for platform dependencies; and
avoid incident creation for jobs that succeed on retries.

17. A non-transitory computer readable medium configured to store instructions for identifying production incidents and implementing automated preventive and corrective measures, wherein, when executed, the instructions cause a processor to perform the following:
generating an event corresponding to a job failure or service degradation;
generating, by the event, an incident in an automation queue;
automatically triggering, in response to the generated incident, a self-healing service that includes:
identifying an application to which the event generated belongs to by accessing a database that stores the application and host details;

fetching functional identification (ID) of the application from the database, wherein the functional ID allows access to production servers to perform required mitigation steps;

identifying a type of job failure or a service degradation;

automatically executing, by utilizing predefined services, the steps required for mitigation;

recording, in response to executing, outcome of the mitigation in the database along with output at each stage of execution; and evaluating the outcome of the mitigation by executing health checks to determine whether a failed job or a process or a host is healthy; and closing the incident based on determining that the failed job or the process or the host is healthy.

18. The non-transitory computer readable medium according to claim 17, wherein, when it is determined that the failed job or the process or the host is not healthy, the instructions, when executed, cause the processor to further perform the following:

transferring the incident to operations team for manual execution;

manually executing the steps required for mitigation; and closing the incident.

19. The non-transitory computer readable medium according to claim 17, wherein the instructions, when executed, cause the processor to further perform the following:

automatically redirecting all data flow job failures to a central self-healing queue;

executing next best actions based on preconfigured error codes; and automatically triggering the self-healing service to minimize human intervention in taking agreed upon design actions around data flow jobs.

20. The non-transitory computer readable medium according to claim 17, wherein the instructions, when executed, cause the processor to further perform the following:

automatically transferring the incident to upstream for known batch issues; and automatically handling an infrastructure incident with documented remediation steps, wherein the known batch issues include file delay and incompatible schema for any scheduler.

* * * * *